United States Patent Office 3,634,364
Patented Jan. 11, 1972

3,634,364
**POLYIMINODIACETIC ACID AND POLY-
SARCOSINE HOMOPOLYMERS**
Lenore Los, Greenbelt, Louis L. Wood, Potomac, and
Nelson S. Marans, Silver Spring, Md., assignors to
W. R. Grace & Co., New York, N.Y.
No Drawing. Filed Sept. 26, 1969, Ser. No. 861,482
Int. Cl. C08g 20/00
U.S. Cl. 260—78 A
6 Claims

ABSTRACT OF THE DISCLOSURE

Iminodiacetic acid is homopolymerized to a polyamide having a 2-nylon type structure. The polymer is formed by heating iminodiacetic acid in an anhydrous aprotic high dielectric solvent with the continuous removal of any water side product.

This invention relates to polyamide homopolymers of iminodiacetic acid and sarcosine. This invention also relates to a method whereby iminodiacetic acid and sarcosine can be homopolymerized. Further, this invention relates to the use of the polyiminodiacetic acid or polysarcosine homopolymers as hot melt adhesives.

The polymers of this invention are useful as hot melt adhesive, fluocculants or wet strength resins. These polymers have a softening point at about 100° C. If applied to a solid substrate at about 100° C. to about 200° C. in the range of the softening point through the flow point, and a second surface overlayed, a laminated article is formed. And in use as a flocculant, the pendent acid groups of the polyiminodiacetic acid are available for hydrogen and/or chelate type bonding. Further, in use as a wet strength resin, when impregnated into a paper treated and cured, the paper is not wetted and broken down by water.

Hot melt adhesive resins are thermoplastic solids that are applied in the molten state and which solidify and bond on cooling. Polyamides as a class have been used as hot melt adhesive resins. However, homopolymers of iminodiacetic acid and sarcosine are new adhesives and these exhibit good bonding qualities. These hot melt adhesives are useful in applications where fast bonding is essential. Since bonding is caused by cooling, the speed of using these adhesives can be controlled by the rate of cooling applied. These adhesives are very useful in continuous bonding processes where fast set up times are required. Hot melt adhesives have considerable use in packaging, wrapping, bookbinding and in shoe manufacturing.

The prior art is devoid of any reference to homopolymers of iminodiacetic acid or sarcosine. Copolymers of iminodiacetic acid and diamines or triamines are known and have been produced. These copolymers are of a polyamide type wherein the iminodiacetic acid groups bond to amine groups to produce a polymer having pendent imino hydrogen atoms. However, this differs from the homopolymers of the present invention. In the present invention the imino hydrogen group of one iminodiacetic acid molecule or sarcosine reacts with acid groups of another iminodiacetic acid molecule or sarcosine and so on to form the polymer product.

It is the object of the invention to produce iminodiacetic acid and sarcosine homopolymers.

It is further an object of the present invention to synthesize iminodiacetic acid and sarcosine homopolymers using aprotic high dielectric constant solvents.

It is also an object of this invention to produce a laminated article by the use of these homopolymers as hot melt adhesives.

SUMMARY OF THE INVENTION

This invention comprises a method of producing homopolymers of iminodiacetic acid and sarcosine by reaction in the presence of an aprotic solvent having a high dielectric constant. Iminodiacetic acid is homopolymerized to a polyamide type polymer having a number of pendent carboxyl groups and sarcosine to a homopolymer having pendent methyl groups. When these polymers are softened to about their flow point, spread on a surface, and a second surface overlayed, a laminated article is formed. Further, when these polymers are impregnated into paper fibers and cured, a paper with a high wet strength will be formed.

DETAILED DESCRIPTION OF THE INVENTION

Iminodiacetic acid is a known substance as to its physical properties and synthesis. One simple route for the synthesis of iminodiacetic acid is via the hydrolysis of iminodiacetonitrile with alkali hydroxide to the dialkali iminodiacetate followed by acidification with a mineral acid such as hydrochloric acid to iminodiacetic acid. Iminodiacetonitrile is produced from the well known reaction of hexamine with hydrogen chloride under acid conditions. Sarcosine, N-methyl glycine, is also a well known substance as to its synthesis and properties.

The homopolymers of the present invention are produced by the reaction of iminodiacetic acid or sarcosine in the presence of aprotic high dielectric constant organic solvents. Aprotic solvents are those which do not contain an active or readily available hydrogen. Many high dielectric solvents are protic such as water, glycol, glycerol and the like and are not useful in this invention. Suitable aprotic solvents for this invention include acetone, methyl ethyl ketone, acetylacetone, furfuraldehyde, chloroacetone, chloroform, dimethyl sulfoxide, dimethylformamide, nitrobenzene and N-methylpyrrolidone. The solvents must also be in an anhydrous condition. The iminodiacetic acid and sarcosine molecules homoreact with the evolution of water to produce polyamide type polymers. The polymerization reaction is essentially that of reaction of the imine hydrogen of one molecule with the carboxyl group of another molecule. On reaction, a mole of water is evolved producing the polyamide link. The preferred organic solvents for reaction include nitrobenzene, dimethylformamide, dimethylsulfoxide, and N-methylpyrrolidone.

Generally, heating is necessary to initiate reaction. Temperatures of 100° C. to 200° C. are very effective for reaction and for this reason it is preferred to maintain the solvent at reflux when possible. Temperatures much below about 75° C. yield a slow reaction rate, while temperatures of much above 200° C. can cause a gradual deterioration of the homopolymer.

As the solvent is heated or refluxed and the condensation reaction is taking place, the solvent gradually becomes wetted. In order to maintain the solvent in an anhydrous condition as possible, the solvent must be continuously dried during reaction. Although various methods can be utilized, the preferred and most efficient is to form a water azeotrope and remove water as a hydrocarbon-water system. The preferred water azeotroping agents are those which have a boiling point in the range of from 70° C. to 150° C. and which form minimum boiling azeotropes with water but are immiscible with water. Most hydrocarbons which will form hydrocarbon-water azeotropic systems are useful as water strippers. Suitable organic azeotroping agents are anisole, phenetole, toluene, benzene, xylenes, cyclohexane, n-hexane, n-heptane and n-octane with the preferred hydrocarbons being toluene, benzene and cyclohexane. In operation, there is a Dean- Stark water trap in-line with the reflux condenser and which operates to trap removed water. After heating at reflux with the azeotroping solvent for about 8 hours to 20 hours, all solvent can be removed yielding the whitish polyiminodiacetic acid or polysarcosine homopolymer. The solvent can be removed using vacuum distillation, a rotovap or any other well known technique of the art. The polyiminodiacetic acid homopolymer has an intrinsic viscosity of about 0.02 to about 1.0 and a softening point of from about 90° C. to 110° C. NMR and IR analysis confirm the presence of an amide link structure and the substantial absence of imine hydrogens. Polysarcosine has an intrinsic viscosity of about 0.02–1.0 and a softening point in the range from 80° C. to 100° C. NMR and IR analyses confirm the presence of an amide link structure.

In use as a hot melt adhesive polyiminodiacetic acid and polysarcosine exhibit good adhesion to metal, plastic and ceramic surfaces. The homopolymer resin is usually applied in a molten state. The substrates may either be heated or at room temperature. The resin is applied to either or both of the substrates and these substrates pressed together to form a laminate. This laminate may be either symmetrical or an offset layered composite. Further, the resin can be used in a solid powdered form if the substrates are heated to above the softening point of the homopolymer resin. This is in the range of from about 90° C. to 110° C. In any instance wherein the resin or substrate, or both, are heated the temperatures should preferably be maintained in the range of the softening point. The temperatures may operably range up to the decomposition point of the resin, however, the efficiency of use decreases with temperature. A hot melt adhesive resin such as polyiminodiacetic acid or polysarcosine is cured by cooling; and for this reason it is preferred to maintain the temperature in the range of the softening point where a slight cooling will rapidly cure the resin.

The pressure exerted during bonding using polyiminodiacetic acid or polysarcosine resins ranges from about 5 p.s.i. to about 10,000 p.s.i. In general, the substrates to be bonded will determine the pressure of bonding. Fragile substrates such as glass, ceramics and such require low pressures while metals and the like can withstand higher pressures. The preferred pressure for the most bonding purposes ranges from about 10 p.s.i. to about 100 p.s.i.

The following examples are set out to further amplify the invention.

EXAMPLE 1

In a 1-liter three-necked flask equipped with condenser and thermometer, place 66.5 g. of iminodiacetic acid and 300 ml. of dimethylformamide. Stir and heat for three hours at a reflux temperature of 153° C. This results in a lowering of the reflux temperature to 148° C. At this point a Dean-Stark trap is attached to the set-up and 100 ml. of toluene is added to azeotrope the water formed in the reaction. After 16 hours of heating all solvent is removed in a rotovap and the final polymer is isolated which is slightly yellow and has an intrinsic viscosity of 0.02–0.15 and a softening point of about 100° C.

EXAMPLE 2

In a 1-liter three-necked flask equipped with condenser and thermometer, place 66.5 g. of iminodiacetic acid and 300 ml. of dimethylsulfoxide. Stir an heat for three hours at a reflux temperature of 90° C. At this point, a Dean-Stark trap is attached to the set-up and 100 ml. of n-hexane is added to azeotrope the water formed in the reaction. After 16 hours of heating all solvent is removed in a rotovap and the final polymer is isolated which is whitish yellow and has an intrinsic viscosity of 0.02–0.15 and a softening point of about 100° C.

EXAMPLE 3

In a 1-liter three-necked flask equipped with condenser and thermometer, there was placed 66.5 g. of iminodiacetic acid and 300 ml. of N-methylpyrrolidone. Stir and heat for three hours at a temperature of 150° C. At this point, a Dean-Stark trap is attached to the set-up and 100 ml. of toluene is added to azeotrope the water formed in the reaction. After 16 hours of heating, the solvent is removed in a rotovap and the final polymer is isolated which is slightly yellow and has an intrinsic viscosity of 0.02–0.15 and a softening point of about 100° C.

EXAMPLE 4

A 1-liter three-necked flask is equipped with a Dean-Stark trap, condenser and thermometer. There is placed in the flask 66.5 g. of iminodiacetic acid, 300 ml. of N-methylpyrrolidone and 100 ml. of toluene. This mixture is heated to reflux for 16 hours. The Dean-Stark trap removes any water that has been azeotroped by the toluene solvent. After reflux for 16 hours all solvent is removed using a rotovap and the final polymer is isolated. This polymer is whitish-yellow in color, has an intrinsic viscosity of 0.02–0.15 and a softening point of about 100° C.

EXAMPLE 5

In a 1-liter three-necked flask equipped with condenser and thermometer, place 100 g. of sarcosine and 450 ml. of dimethylformamide. Stir and heat for three hours at a reflux temperature of 153° C. This results in a lowering of the reflux temperature to 148° C. At this point, a Dean-Stark trap is attached to the set-up and 50 ml. of toluene is added to azeotrope the water formed in the reaction. After 16 hours of heating all solvent is removed in a rotovap and the final polymer is isolated which is whitish and has an intrinsic viscosity of 0.02 and a softening point of about 90° C.

EXAMPLE 6

In a 1-liter three-necked flask equipped with condenser and thermometer, place 100 g. of sarcosine and 450 ml. of dimethylsulfoxide. Stir and heat for three hours at a temperature of 90° C. At this point, a Dean-Stark trap is attached to the set-up and 100 ml. of n-hexane is added to azeotrope the water formed in the reaction. After 16 hours of heating all solvent is removed in a rotovap and the final polymer is isolated which is whitish yellow and has an intrinsic viscosity of 0.05 and a softening point of about 90° C.

EXAMPLE 7

A 0.02 g. sample of polyiminodiacetic acid adhesive resin is placed on one end of a 30 ml. thick, 6 inch by 1 inch piece of chromate treated aluminum. A second piece of aluminum of similar size and treatment is overlapped at the end containing the adhesive. This overlapping composite is placed in a Pasadena press and heated to 105° C. for a 1 minute pre-heating period. Heating is continued and 6000 p.s.i. of pressure is applied for 1 minute. The composite is removed and cooled for 30 minutes. The bond did not fail during subsequent tension and flexing tests.

EXAMPLE 8

A 0.02 g. sample of polyiminodiacetic acid is placed between 2 glass plates having a 1 inch square overlap. This glass plate composite is heated to about 110° C. and 10 p.s.i. of pressure applied. The two glass plates firmly adhered to each other and did not fail during subsequent tests.

EXAMPLE 9

A 0.02 g. sample of polyiminodiacetic acid is placed between 2 glass plates having a 1 inch square overlap. This glass plate composite is heated to about 150° C. and a 10 p.s.i. pressure is applied. The two glass plates on cooling firmly adhered to each other.

EXAMPLE 10

A 0.02 sample of polysarcosine is placed between 2 aluminum 30 ml. thick plates and the procedure set out in Example 7 followed. Upon cooling, the two aluminum plates were found to firmly adhere to each other and the bond did not fail during subsequent tension of flexing tests.

EXAMPLE 11

A 0.02 g. sample of polysarcosine is placed between two glass plates in a procedure similar to that of Example 9 except that the temperature is maintained at 125° C. On cooling, it was found that a good bond had formed between the two glass plates.

What we claim is:

1. The homopolymer polyiminodiacetic acid essentially having a structure

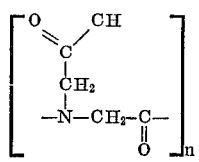

2. The method of producing the homopolymer selected from the group consisting of polyiminodiacetic acid and polysarcosine comprising:
   (a) forming a mixture of a monomer selected from the group consisting of sarcosine and iminodiacetic acid and an aprotic, anhydrous solvent having a high dielectric constant;
   (b) heating this mixture;
   (c) removing water of reaction from this mixture;
   (d) removing all solvent; and
   (e) recovering said homopolymer.

3. The method of claim 2 wherein said solvent is selected from the group consisting of dimethylformamide and dimethylsulfoxide and N-methylpyrrolidone.

4. The method of claim 2 wherein said mixture is heated to reflux.

5. The method of claim 2 wherein said water is removed by azeotropic distillation and said solvent by evaporation.

6. The method of claim 2 wherein said monomer is sarcosine and said homopolymer is polysarcosine.

References Cited

UNITED STATES PATENTS

| | | | |
|---|---|---|---|
| 2,516,162 | 7/1950 | Tullock | 260—78 UX |
| 2,534,283 | 12/1950 | MacDonald | 260—78 |
| 3,386,966 | 6/1968 | Bach | 260—78 |

OTHER REFERENCES

Chemical Society Journal, pt. 4, 1959, pp. 3442–3446, Pope et al.

Chemical Society Journal, pt. 2, 1961, pp. 2057–2063, Bamford et al.

Radiation Research 18, pp. 552–554 (1963), Drew et al.

Chem. Abstracts, vol. 59, 1963, 1267f–g, Hering.

Chem. Abstracts, vol. 60, 1964, 110g–h, Gratzer et al.

HOWARD E. SCHAIN, Primary Examiner

U.S. Cl. X.R.

156—331; 161—197, 214, 227, 229

UNITED STATES PATENT OFFICE
CERTIFICATE OF CORRECTION

Patent No. 3,634,364　　　　　　　　Dated　January 11, 1972

Inventor(s) Lenore J. Los, Louis L. Wood and Nelson S. Marans

It is certified that error appears in the above-identified patent and that said Letters Patent are hereby corrected as shown below:

1　　　Claim 1. The homopolymer polyiminodiacetic acid essentially having a structure

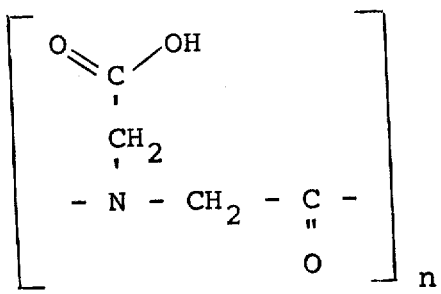

Line 3, change "CH" to - OH - .

Signed and sealed this 30th day of May 1972.

(SEAL)
Attest:

EDWARD M. FLETCHER, JR.　　　　　　ROBERT GOTTSCHALK
Attesting Officer　　　　　　　　　Commissioner of Patents